Aug. 20, 1935.  E. E. POULIN  2,011,871
BREAD SLICING MACHINE
Filed Sept. 19, 1932   6 Sheets-Sheet 1
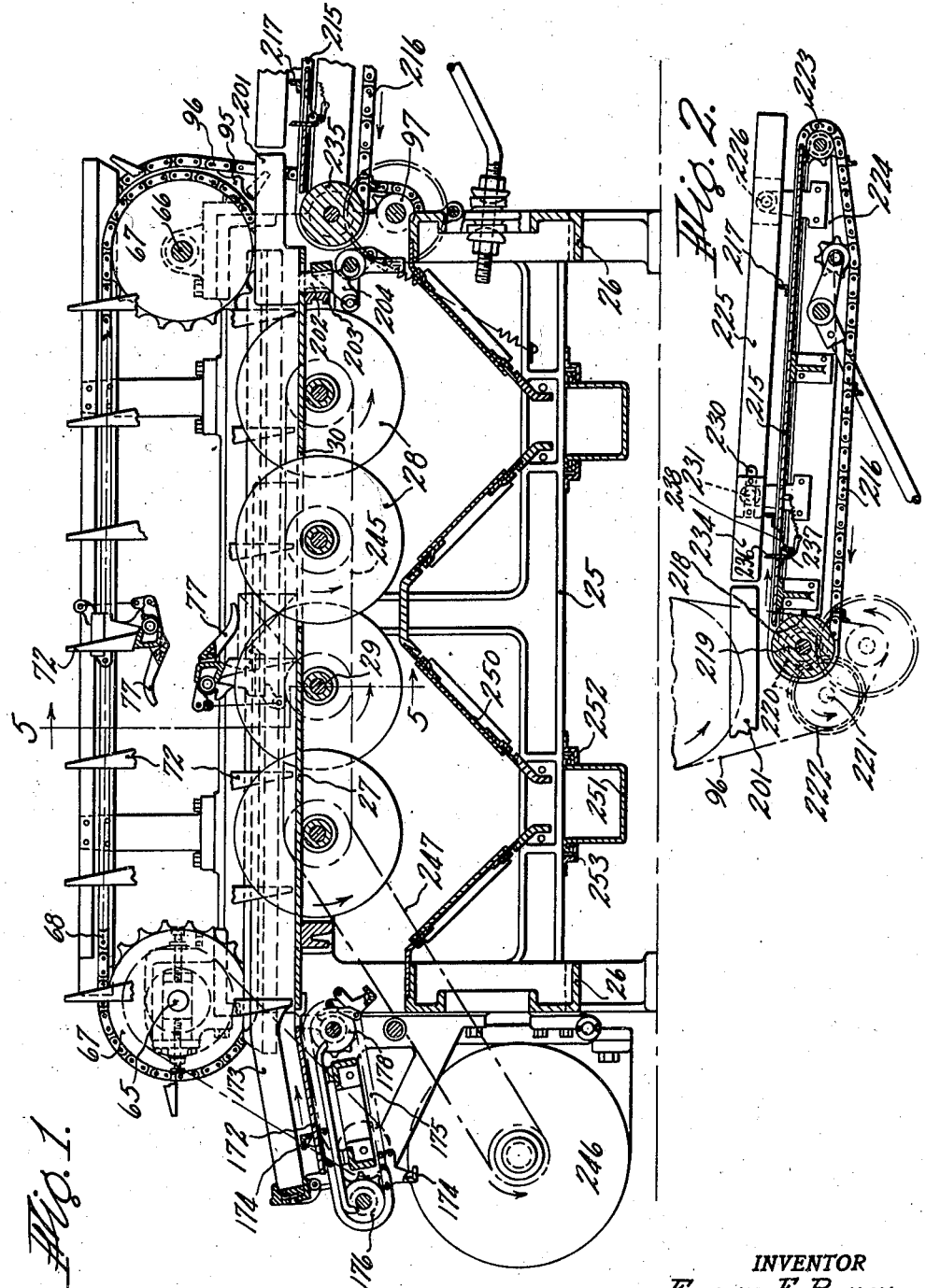
INVENTOR
EDMOND E. POULIN
BY Chapin & Neal
ATTORNEYS Aug. 20, 1935.  E. E. POULIN  2,011,871
BREAD SLICING MACHINE
Filed Sept. 19, 1932  6 Sheets-Sheet 2
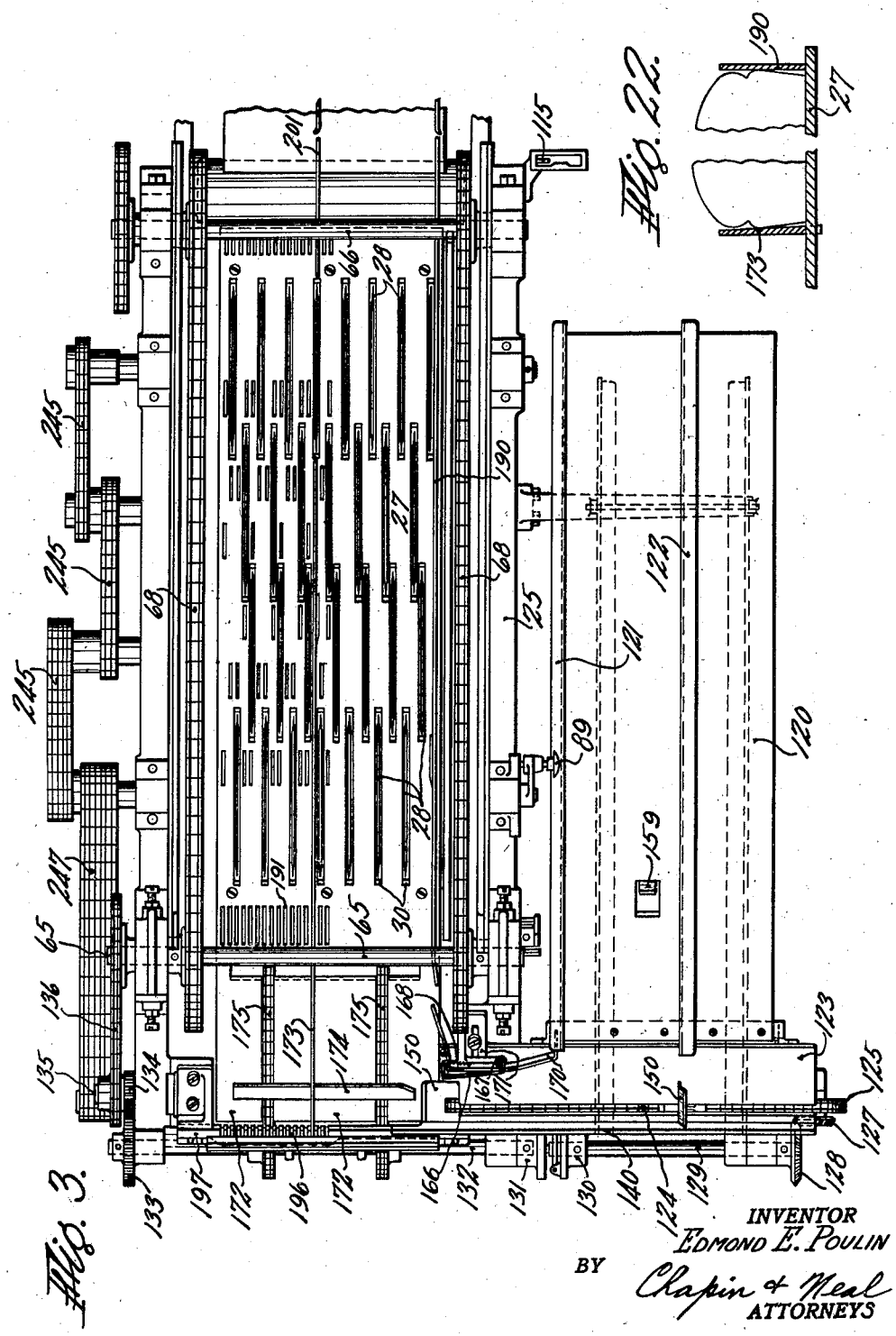
INVENTOR
EDMOND E. POULIN
BY Chapin & Neal
ATTORNEYS Aug. 20, 1935.  E. E. POULIN  2,011,871
BREAD SLICING MACHINE
Filed Sept. 19, 1932  6 Sheets-Sheet 3
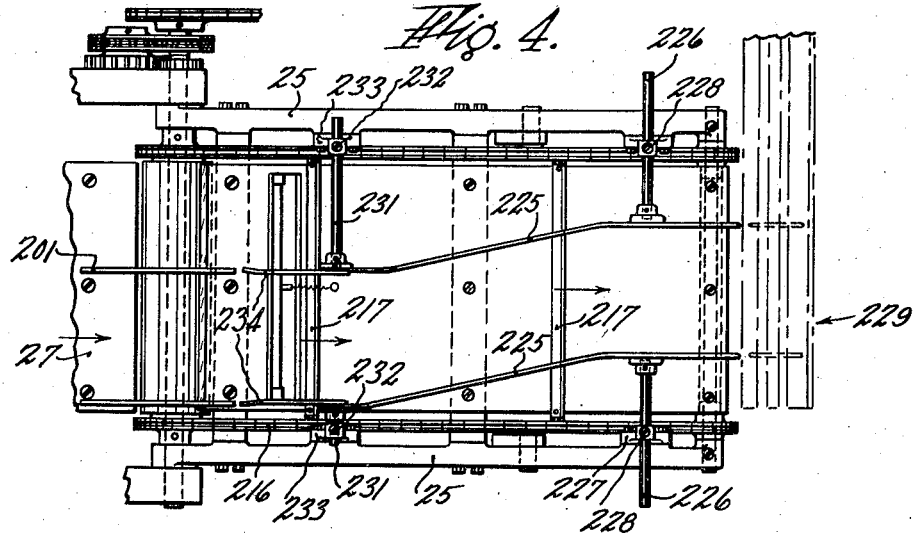
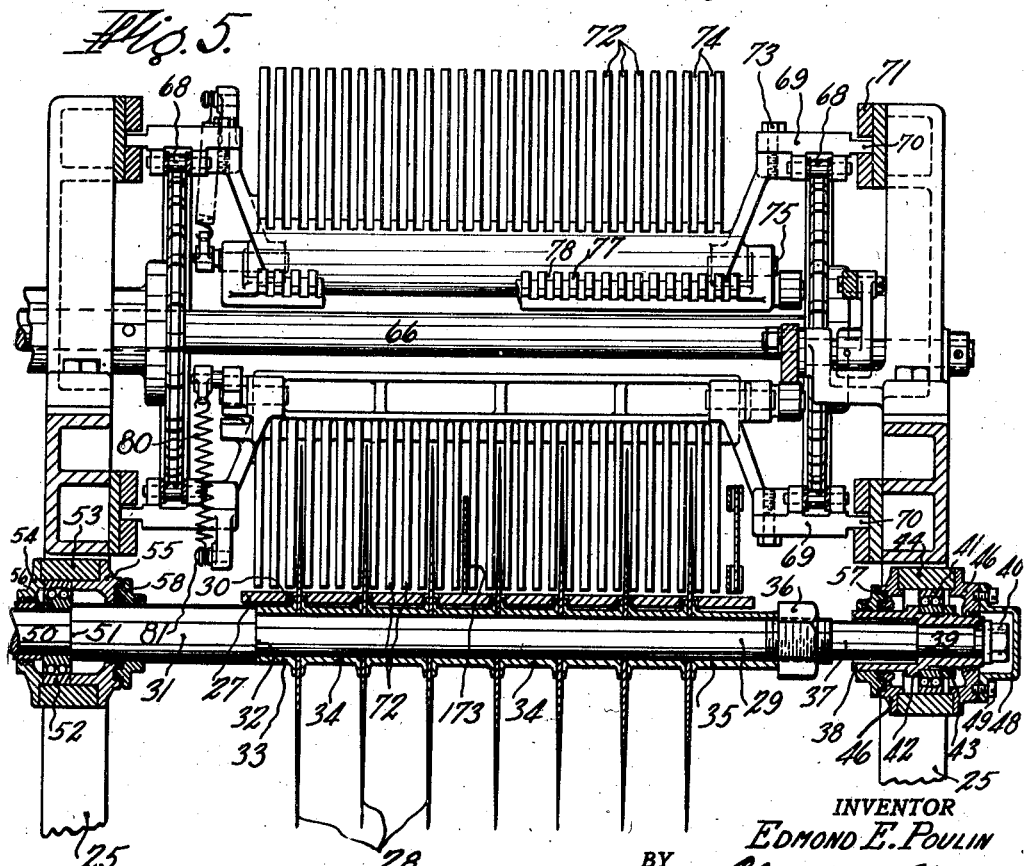
INVENTOR
EDMOND E. POULIN
BY Chapin & Neal
ATTORNEYS

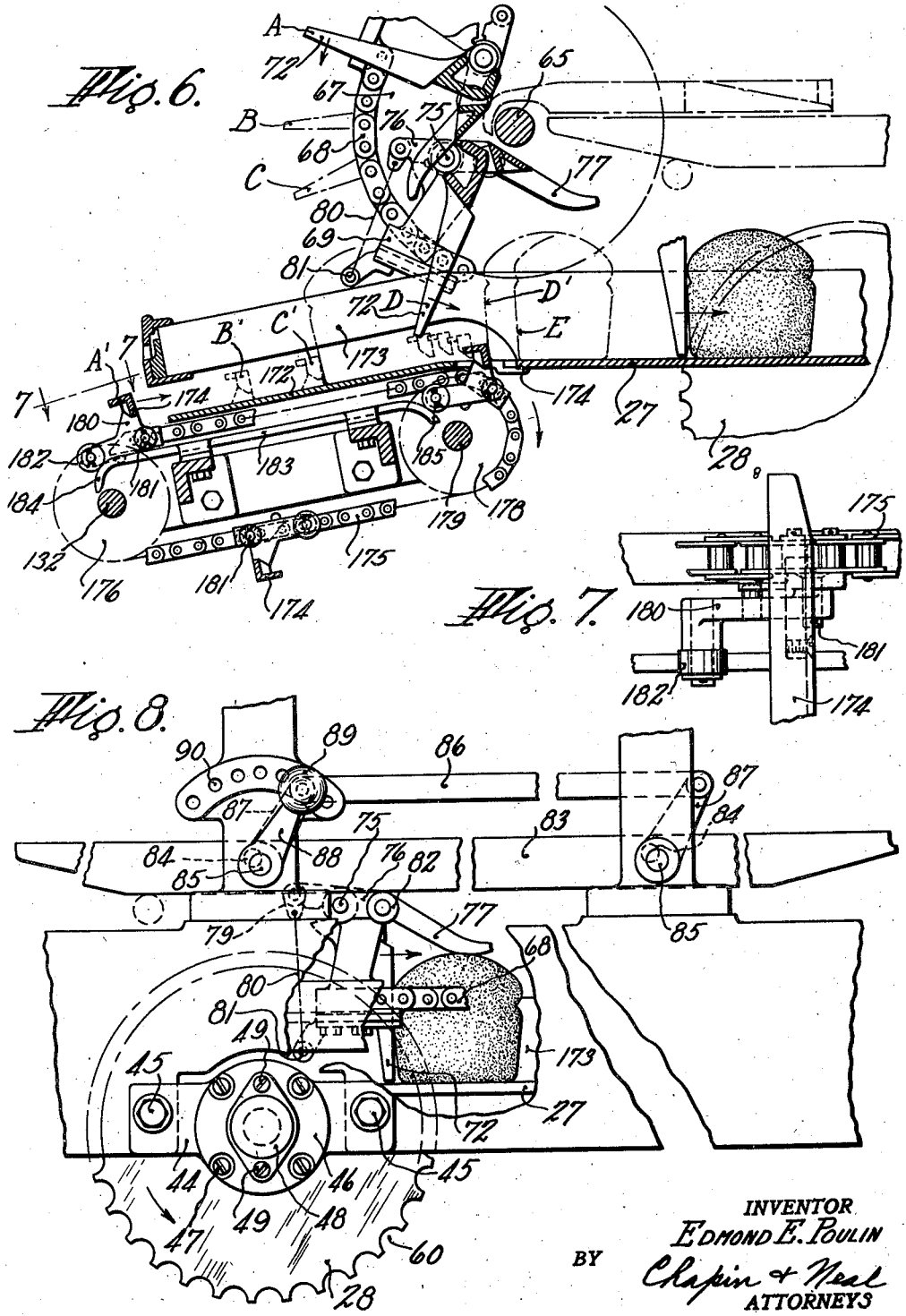

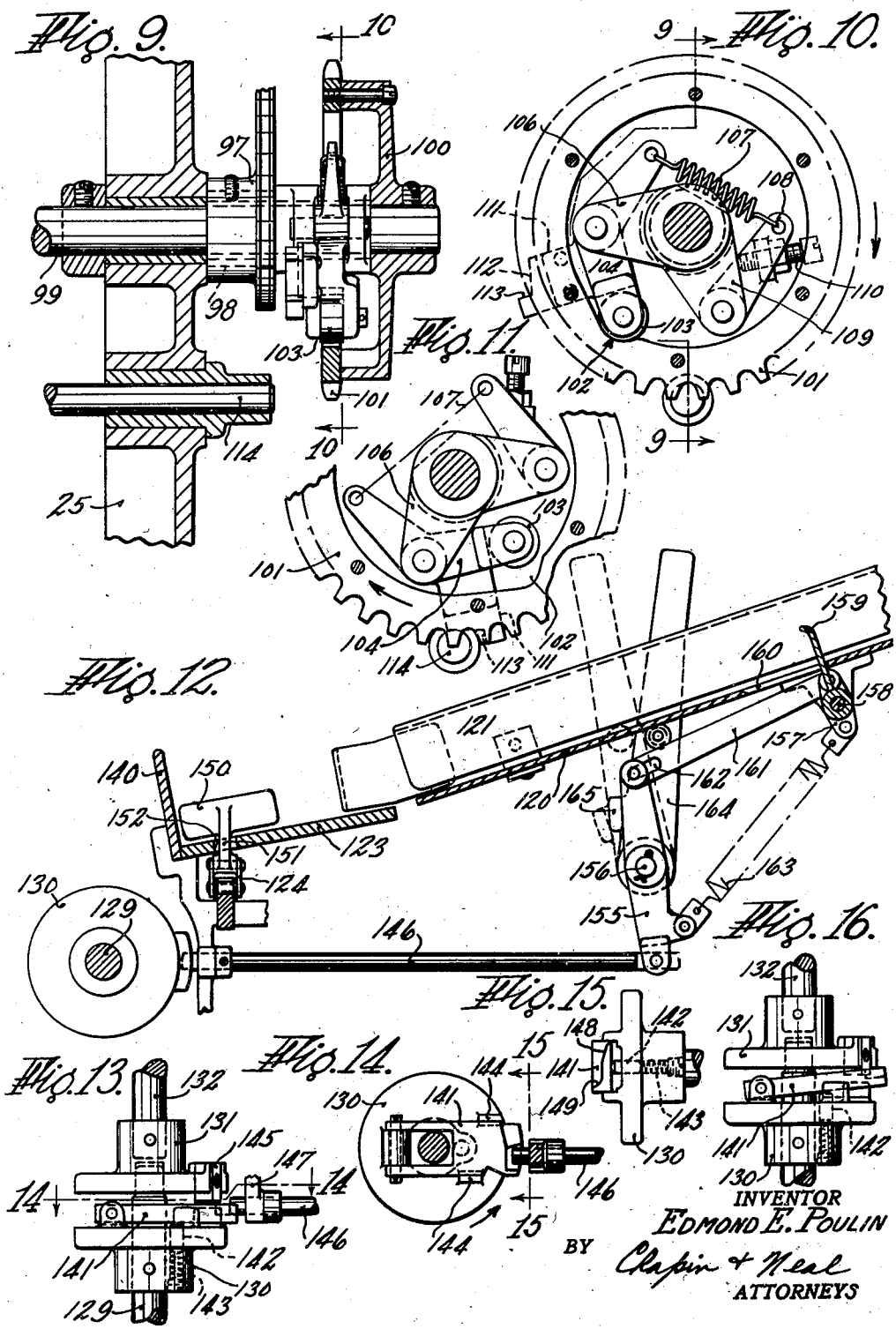

Aug. 20, 1935.  E. E. POULIN  2,011,871.
BREAD SLICING MACHINE
Filed Sept. 19, 1932   6 Sheets-Sheet 6
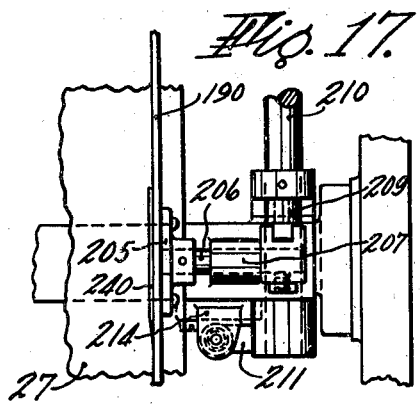
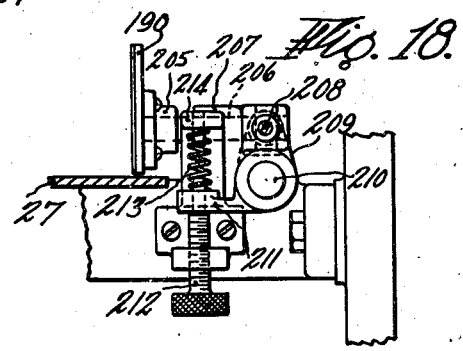
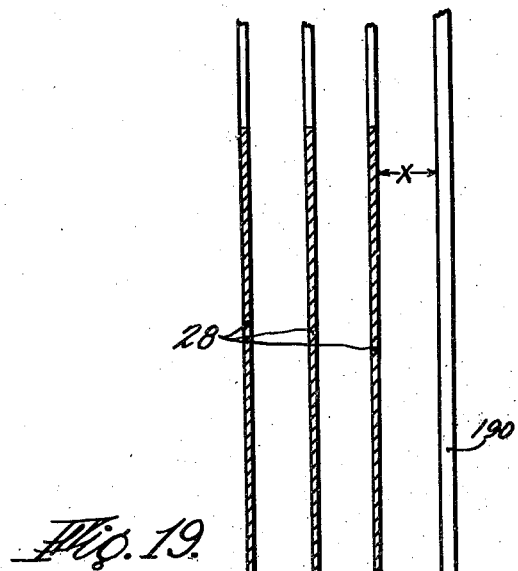
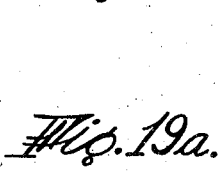
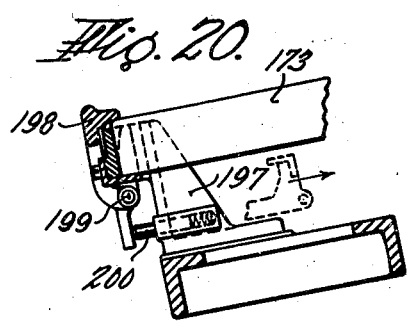
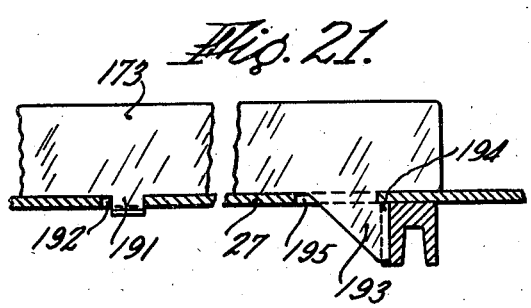
INVENTOR
EDMOND E. POULIN
BY Chapin & Neal
ATTORNEYS Patented Aug. 20, 1935

2,011,871

UNITED STATES PATENT OFFICE 2,011,871

BREAD SLICING MACHINE

Edmond E. Poulin, Springfield, Mass., assignor to National Bread Wrapping Machine Co., Springfield, Mass., a corporation of Massachusetts Application September 19, 1932, Serial No. 633,759

20 Claims. (Cl. 146—98)

This invention relates to machines for slicing loaves of bread and retaining the slices in assembled loaf form. One object of the invention is to improve existing machines of this general character in respect to their simplicity of construction, speed of operation, durability, and smoothness of cut. An additional object is to improve the mechanism for transporting the loaves past the slicing devices. An additional object is to improve the mechanism for feeding the loaves into the machine. An additional object is to provide improved mechanism for guiding the loaves during the cutting operation. An additional object is to provide improved mechanism for delivering the sliced loaves from the machine. An additional object is to provide improved mechanism for adjusting the machine for loaves of different sizes. An additional object is to provide improved clutch mechanism for driving the loaf forwarding devices and for coordinating the action of the slicing machine with a wrapping machine with which it is to be used. Other objects will appear from the following description and claims.

Referring to the drawings,

Fig. 1 is a central longitudinal section through the machine, some of the loaf forwarding devices having been omitted;

Fig. 2 is a similar view showing portions of the mechanism beyond the right-hand end of Fig. 1;

Fig. 3 is a top plan view of the machine with the loaf forwarding conveyer removed to disclose the parts beneath it;

Fig. 4 is a similar plan view of the mechanism shown in Fig. 2;

Fig. 5 is a transverse section taken on line 5—5 of Fig. 1;

Fig. 6 is a detail on an enlarged scale of parts shown in Fig. 1, illustrating the action of the feeding-in conveyer;

Fig. 7 is a detail plan, taken on line 7—7 of Fig. 6;

Fig. 8 is a partial side elevation of the machine;

Fig. 9 is a detail of the main drive clutch, taken on lines 9—9 of Fig. 10;

Fig. 10 is a detail on line 10—10 of Fig. 9;

Fig. 11 is a similar view with the parts in a different position of operation;

Fig. 12 is a longitudinal section through the inclined loaf feed chute, showing the operation of the control lever for the in-feeding conveyer;

Fig. 13 is a detail plan of the clutch for the feeding-in conveyer;

Fig. 14 is a section on line 14—14 of Fig. 13;

Fig. 15 is a section on line 15—15 of Fig. 14;

Fig. 16 is a detail similar to Fig. 13 but showing the parts in a different position of operation;

Fig. 17 is a detail plan of the adjustable supporting means for one of the side guiding plates;

Fig. 18 is an elevation thereof;

Fig. 19 is a plan view showing the coaction between one of the cutters and one of the side guides;

Fig. 19a is a modification of the mechanism shown in Fig. 19;

Fig. 20 is a longitudinal section showing the manner of mounting one end of one of the side guides;

Fig. 21 is a similar view of the other end of the guide; and

Fig. 22 is a transverse section showing the manner of guiding a loaf.

The main portion of the machine will be described before the in-feeding and delivery conveyers are considered. Slicing is accomplished by carrying the loaves, suitably held and guided to prevent shifting, past a plurality of sets of rotating disk cutters, each set consisting of a plurality of cutting disks on a common axis. The several sets are staggered so that adjacent cuts in the loaf are made at different stations and are preferably overlapping as shown in Fig. 3. For example, if one-half inch slices are to be made and four gangs of cutters are employed the disks in each gang are two inches apart, the disks in successive gangs being staggered. This arrangement is advantageous since the loaf is necessarily compressed when it passes between adjacent disks on the same axis, and the further apart these disks are the less the compression per unit of length will be. If too great compression results between adjacent disks the inside of the loaf will scuff off along the line of cut, wasting bread and producing unsightly slices. The manner in which this effect is guarded against will appear more clearly after the mechanical construction of the machine has been considered. There is also some compression of the loaf where the cutter enters it. To prevent this latter compression being unsymmetrical, the cutters are arranged so that each cutter after those in the first gang enters the loaf will be half way between two previously made cuts.

The slicing machine proper is carried upon side frames 25 held together by suitable cross members 26. A bed plate 27 extends the length of the machine and serves as a support along which the loaves are carried. Cutting disks 28 are carried upon shafts 29 and project upwardly through slots 30 in the bed-plate as shown in Figs. 3 and 5. It has been found in practice to be of great importance that the shafts which support the gangs of cutting disks run with great freedom and steadiness. With this in view the bearing mounting shown in Fig. 5 has been devised.

The shaft 29 has an enlarged portion 31 forming a shoulder 32 where it joins the body of the shaft. Against this shoulder fits a spacing collar 33. The cutting disks 28 are perforated to slide over the shaft and are located respectively between collar 33 and one of a series of intermediate collars 34, between adjacent intermediate collars 34, and between the last intermediate collar 34 and a second spacing collar 35 which is held in place by a nut 36. The two end collars 33 and 35 vary in length on the different shafts to secure the staggering of the disks while the intermediate collars 34 are all of the same length. The end of shaft 29 adjacent the nut 36 is reduced at 37 to fit within a shouldered sleeve 38, and again at 39 to fit within the smaller end of the sleeve. The sleeve is held to the shaft by the interengagement of their shouldered portions and by a flanged nut or stud 40 at the end of the shaft. A combined radial and thrust ball bearing 41 is mounted upon the outside of the sleeve 38, being held between a shoulder 42 and a clamp nut 43. The outer race of this bearing floats upon the cylindrical inner surface of a bearing member 44 held to the frame of the machine by studs 45 as shown in Fig. 8. Cover plates 46, preferably fluted adjacent the sleeve to act as a grease packing, are held by bolts 47 (Fig. 8) to the side frames, while the stud 40 is protected by a smaller cover plate 48 secured to the first plate by screws 49.

The other end of the shaft 29 is reduced at 50 to form a shoulder 51, against which a combined radial and thrust bearing 52 is pressed. The outer race of this bearing fits within the cylindrical bore of a member 53 secured to the frame in a manner similar to the bearing member 44. Fastened to the sides of the member 53 are a pair of spacing and packing members 54 and 55, having shoulders engaging the outer race of the ball bearing and being fluted on their surfaces adjacent the shaft to serve as a lubricant packing. A spacing sleeve 56 abuts the inner ball race to hold it against the shoulder 51, and is held in place by a flanged stud (not shown) similar to the stud 40. Preferably additional packing members 57 and 58 are located on the shaft 29 within the opposite bearing members, interlocking with the inner cover plate 46 and with the packing member 55 respectively to give additional protection against the bearing lubricant flowing out.

The slicing blades 28 are made in disk-like form, preferably tapering gradually from their center to their edges. This form gives the maximum stability with a minimum of resistance as the blades pass through a loaf. In order to assist in the formation of a clean cut the blades are preferably fluted or serrated as shown at 60 in Fig. 8, the fluting found to be best suited for the purpose being in the form of generally semicircular notches spaced around the periphery of the disk. It is especially desirable to avoid any breaking of the upper crust of the bread, and for this reason it has been found preferable to rotate the disks towards the oncoming loaf. The shafts on which the disks are mounted being underneath the loaf supporting table, this direction of rotation causes the advance cutting edge of the disk to move downwardly through the crust and thus prevent flaking. With certain types of bread it may be found desirable to set the teeth of the first cutter in a manner similar to the setting of teeth on a circular saw. It will in general be found unnecessary to set the teeth on any cutters except those of the first gang.

The loaves are carried successively past the cutting disks by an endless chain conveyer mounted upon spaced shafts 65 and 66. During the normal operation of the machine these shafts rotate continuously, so that the loaves move steadily past the cutters. Each of the shafts carries a pair of spaced sprockets 67, around which pass parallel endless chains 68. At intervals along these chains brackets 69 (Figs. 5 and 6) are supported by special links. During their travel along the upper and lower runs of the conveyer lugs 70 on these brackets pass through a guideway 71 secured to the frame, by means of which the brackets are held against rotation. Pusher members 72 are secured by bolts 73 to opposite brackets 69 and have slots 74 adapted to permit the pusher to pass the several staggered cutting disks along their line of travel.

Pivoted at 75 (Fig. 8) to each end of each pusher 72 is a holder 76 having an extension 77 overlying the loaf when the conveyer is in its lower run and slotted at 78 (Fig. 5) to permit the holder to pass the cutters. At one end of each holder 76 is a lug 79 (Fig. 8), connected by a tension spring 80 with a pin 81 on the corresponding bracket 69. The tendency of this spring is to hold the forward end of the holder up out of contact with the loaf. This action is resisted and the holder maintained at a constant (but adjustable) level by contact of a roll 82 on the holder with a rail 83 extending along the side of the machine. The rail 83 is supported upon eccentric studs 84 carried by spaced shafts 85 rotatable in the frame. Synchronous rotation of the shafts is accomplished by a tie bar 86 joining parallel arms 87 on the two shafts. One of the shafts is provided with a handle 88 having a spring pin 89 locatable in any one of an arc-shaped series of holes 90. By this means the rail 83 can be located in any desired position, while keeping at all times parallel to the bed-plate along which the loaves travel. As the pusher elements pass along the bed the holders 76 are held down positively upon the top of the loaves by contact between the rolls 82 with the rail 83. It has been found that this positive contact is more satisfactory than a contact maintained by the weight of the holder or by a spring since it is more certain in preventing any movement or tipping over of the loaf and at the same time avoids excess compression of the loaves. The holders are preferably set so that they rest without substantial compression upon a normal loaf. The slight compression given to an abnormally high loaf is thus not made heavy enough to be harmful. It will also be noticed that the holders do not seat upon the top of the loaves until the latter have passed well through the first cutter gang. The presence of any compression is in this way further guarded against during the formation of the first cut, which in practice proves the most difficult to make smoothly.

Shaft 66 is provided with a sprocket 95 (Fig. 1) joined by a chain 96 with a sprocket 97 (see also Fig. 9) carried by a sleeve 98 rotatable upon a shaft 99. To the end of this shaft is secured a spider 100 upon which is mounted a sprocket 101 driven by a chain from any suitable source of power, preferably the bread wrapping machine to which the slicer is to deliver the sliced loaves. By this direct connection between the machines the loaves are always delivered in proper timed relation. It is desirable to be able to stop the slicing machine independently of the wrapping machine, and to be able to start it again without affecting the timing of the delivery of the loaves. The wrapping machine has generally an automatic control so that its functioning is not disturbed by the non-delivery of a loaf to it, but a delivery of a loaf in improperly timed relation might cause jamming. For this reason a clutch mechanism is provided between the sprockets 101 and 97 by which they may be disengaged when desired, but which will cause them to be engaged only in a single timed relation. This clutch also preferably acts as an overload release as will be described below.

The internal annular surface of the sprocket 101 is generally cylindrical, but has at one place a recess 102 having one steep slope and one gradual slope. A roller 103 (Figs. 10 and 11) is mounted on the end of a lever 104 pivoted on an arm 106 on the sleeve 98 mentioned before. The lever is biased by a spring 107 stretched between it and an arm 108 pivoted on a second arm 109 on the sleeve with a tension dependent upon the position of the arm 109 as determined by an adjustment screw 110. Secured to the lever 104 is an abutment 111 having a cam surface 112 and a stop 113. Reciprocable in the machine frame is a rod 114 (Fig. 9) which in the position shown is out of the path of the abutment but which may be projected into that path by suitable connections (not shown) to a hand-operated clutch lever 115 (Fig. 3). When the rod is moved into the path of the abutment the lever 104 is shifted to a position bringing the roll 103 out of the recess 102 (Fig. 11), and the stop 113 then strikes the rod to arrest further rotation of the sleeve 98 and the loaf conveyer driven by it. The sprocket 101 then continues to rotate with the wrapping machine. When it is desired to restart the slicing machine the clutch lever 115 is moved to withdraw the rod 114 from the path of the abutment. The sprocket 101 continues its rotation until the recess 102 picks up the roll 103, whereupon the slicing machine is again started, in accurately timed relation to the wrapping machine. If at any time, due to the jamming of a loaf in the slicing machine or to some other cause, the load on the slicing machine becomes too great the roll 103 will ride up out of the recess and permit the sprocket 101 to continue its rotation without carrying the roll with it. The overload at which this effect takes place can be varied by adjusting the screw 110.

The loaves are placed for delivery into the machine upon an inclined runway, 120 (Figs. 3 and 12) having one fixed side guide 121 and one adjustable side guide 122. The loaves slide down this runway by gravity, being delivered onto a lateral guideway 123 along which an endless chain conveyor 124 passes. At one end this chain passes around a driven sprocket 125 (Fig. 3) and at the other end around an idle sprocket (not shown). The driven sprocket has attached to it a bevel gear 127 meshing with a bevel gear 128 on a cross shaft 129 bearing a clutch member 130 at its other end. A second cooperating clutch member 131 is mounted in axial alignment with the first one on the end of a cross shaft 132. At the other end of this shaft is a gear 133 meshing with a gear 134 on a stub shaft 135 joined by a chain and sprocket connection 136 with the adjacent conveyer drive shaft 65. The shaft 132 is thus driven continuously while the main conveyer is in operation, whereas the shaft 129 is under the control of the clutch 130, 131.

This clutch is interposed in the drive of the chain conveyer 124 for the purpose of preventing its operation in case there is not a sufficient number of loaves on the runway 120 to give a sufficient pressure on the lowermost one to insure its accurate positioning against the side guide 140 on the lateral guideway 123. On the clutch member 130 is pivoted an arm 141 (Figs. 13 to 16) having its end shaped as best shown in Fig. 15. This arm is constantly urged towards the clutch member 131 by a plunger 142 slidable in a hole in the member 130 and pressed outwardly by a spring 143. The arm is forked as shown in Fig. 14 to straddle the shaft, and swings between spaced guides 144. When the arm is allowed to follow the pressure of the spring plunger it projects into the path of a driving lug 145 on the driving clutch member 131, thereby coupling the shafts 129 and 132 for rotation together. A rod 146 is slidable in a fixed guide 147, and can be projected into the path of the end of arm 141 as shown in Figs. 13 and 14. The rod is struck first by the tapered portion 148 of the arm end, camming the arm out of contact with the driving lug 145. The rod then is struck by the rounded end portion 149 of of the arm end, stopping the rotation of the arm and consequently of the shaft 129 until such time as the rod is again shifted to the right as viewed in Fig. 13. It will be observed that the shaft 129 when driven will be always in the same angular relation to the shaft 132, so that the paddles 150 which project above the guideway 123 will always deliver the loaves in constant timed relation to the infeed conveyer driven by shaft 132 and to be described below. On account of the preferred angular position of that infeed conveyer the guideway 123 is preferably slanted as shown in Fig. 12, the ends of the paddles being similarly slanted with respect to their shanks 151 which pass vertically through a slot 152 in the guideway.

The means for controlling the position of the rod 146 are illustrated in Fig. 12. At its end located at the right in that figure the rod is coupled to a lever 155 pivoted at its center to a stub shaft 156. A second smaller lever 157 is pivoted centrally to a shaft 158 which carries a feeler 159 projecting upwardly through a slot 160 in the guideway 120. The upper end of lever 157 is joined by a link 161 to the upper end of lever 155 through a pin and slot connection 162 allowing a degree of lost motion. The lower ends of the two levers are joined by a tension spring 163. Also pivoted to the stub shaft 156 is a control lever 164 having at its side a lug 165 adapted to engage the lever 155. The operation of this mechanism will be considered first when the control lever 164 is in the dotted line position of Fig. 12, the position in which it remains while it is desired to continue the feed of loaves. In this case the lug 165 is at all times out of contact with the lever 155. As long as the line of loaves in the guideway 120 is continuous from the bottom up to the feeler 159 the feeler will remain depressed with its end flush with the bottom of the guideway. Both spring 163 and the link 161 then cooperate to hold lever 155 rotated into a position where the rod 146 is withdrawn from the path of the arm 141, permitting the clutch 130, 131 to remain in engagement.

If now the supply of loaves fails so that the feeler 159 is allowed to spring upwardly the link 161 will draw the lever 155 clockwise so that the rod 146 will be projected into clutch disengaging position. It will be noted that the leverage of link 161 on lever 155 is greater than that of spring 163. The feeler will remain in elevated position as long as the supply of loaves is deficient, again being depressed and withdrawing rod 146 when loaves are again fed. It will be observed that the cross feed conveyer is stopped by this mechanism without arresting the main conveyer. This permits the machine to clear itself and prevents any loaf being left between the cutters. Restarting of the cross-feed conveyer will always be in proper timed relation to the remainder of the machine on account of the fact that engagement of the two clutch members must await the registration of arm 141 and lug 145. If it is desired to stop the cross-feed conveyer at any time independently of the continuity of the loaf supply the control lever 164 may be moved to the full line position of Fig. 12, its lug 165 holding the lever 155 positively in clutch-disengaging position, irrespective of the position of the feeler 159.

As the loaves are carried endwise along guideway 123 they encounter a side guide 170 held adjustably by a screw and slot connection 171 and provided with a beveled leading end by which the loaves are carried into accurate registration with the opposing side guide 140. They are deposited by the pushers 150 upon a platform 172 inclined at an angle similar to that of the guideway and against an end stop plate 173 adjustably mounted as will be described. This plate also serves as one end guide for the loaves during their movement past the cutting disks. Traveling over the platform 172 are a series of pushers 174 (three in the case shown) carried by parallel chains 175. These chains pass around spaced sprockets 176 (Fig. 6) on the constantly driven shaft 132 and around idler sprockets 178 on a cross shaft 179. The speed with which these chains move is somewhat higher than that of the chains 68, and the pushers 174 are spaced further apart than the pushers 72 for that reason. When the machine is operated at high speed the loaves may rebound from the plate 173 and be jammed against the guide 170 when they are advanced by the pushers 174. To prevent this a latch 166 (Fig. 3) is pivoted at 167 to the guide and is held normally in the path of the loaves by a spring 168. When a loaf is advanced by the pushers 150 this latch is forced back against the action of its spring, only to snap out again as soon as the loaf has passed so that rebound is effectively prevented.

Not much excess room is given between the pushers 72, they being kept as close together as possible in order to avoid the machine being of undue length. The problem of placing the loaves between the pushers was, therefore, one of some difficulty. Due to the high speed of the cross conveyer which would have been necessary and to the difficulty of positioning the loaves accurately and without damage at such a speed, a direct introduction of the loaves between the pushers 72 was found to be undesirable. The provision of the infeeding conveyer 175, receiving the loaves from the cross conveyer and moving in the same general direction as the main conveyer to position them between the pushers 72 has in practice been found to be an excellent solution. As the pushers 72 pass around the sprocket 67 they diverge from one another (Fig. 6), temporarily increasing the space between them and permitting the loaves to pass into place without interference. Successive positions of the pushers 72 on the one hand, and of the pushers 174 and a loaf carried by one of them on the other hand, are indicated in Fig. 6 by A, B, C, D, and A', B', C', D' respectively.

So that the pushers 174 may release the loaf while keeping their pushing surfaces substantially parallel to the rear side of the loaf they are preferably secured to the chains 175 by the mechanism shown in Figs. 6 and 7. Each pusher is formed at each end with a bracket 180 pivoted to the adjacent chain at 181. A roll 182 is also carried by the bracket and bears upon the upper surface of a plate 183 located between the sprocket. During the active travel of the pushers the plate serves to keep them in proper alignment. The leading end of the plate is rounded at 184 to assist in picking up the roll, and the opposite end is rounded at 185 so that as the pusher starts to move around the sprocket its leading end will be kept parallel to the rear of the loaf as appears in Fig. 6. The loaf is deposited on the plate 27 in the position E, and is immediately picked up by the next pusher 72.

As the loaf is carried along the bed-plate 27 by the pushers 72 they are guided on one end by the rail 173 and at the other by a rail 190. Both rails are preferably adjustable, the rail 173 being bodily movable by definite increments to accommodate major changes in loaf length, and the rail 190 being shiftable through a smaller range to obtain the exact adjustment desired for equalizing the thickness of the two heels cut from the loaf. Rail 173 has formed on its bottom lugs 191 (Fig. 21) which fit into slots 192 in the bed-plate, and at its end remote from the platform 172 a lug 193 provided with a hook 194 adapted to underlie the bed-plate when it is inserted through a slot 195 and the rail pushed forwardly. The rear end of the rail is adapted to fit into one of a series of notches 196 (Fig. 3) in a bracket 197 and to be held in position by a clamp piece 198 (Fig. 20) pivoted to the bracket at 199 and held in clamping position by a spring plunger 200. When it is desired to remove the rail the clamp is swung manually out of position and the end of the rail lifted out of its notch 196. The rail can then be drawn rearwardly enough to disengage the hook 194, whereupon the lugs can be lifted clear of their slots and the rail pulled out from between the saws.

On account of the staggered relation of the cutting disks the rail 173 will always be in alignment with one of them, and a single rail is for this reason only capable of location at intervals corresponding to similar dispositions of the cutting disks. This is not ordinarily close enough, and it is therefore desirable to provide additional rails of differing length. In the case shown the rail passes the first three disks and terminates in alignment with the last disk. A rail 201 is provided beyond the last disk and held in alignment with it by a lug 202 (Fig. 1) held against a stop 203 by a spring pressed clamp piece 204 to continue the guidance of the loaf. The replacement rails 173 and 201 used for intermediate adjustments will come in alignment with the first, second, and third disks respectively, permitting the location of the guiding rail by increments corresponding to the width of slice to be cut.

The opposite rail 190 is secured to brackets 205 (Figs. 17 and 18) mounted on rods 206 free to reciprocate in bearings 207. The rear ends of of these rods are pivoted at 208 to arms 209 attached to a longitudinally extending rod 210. At one end of this rod is secured an arm 211 perforated to receive the shouldered end of a screw 212 and held against the shoulder by a compression spring 213 bearing against a fixed abutment 214. By turning the screw 212 the rod will be rocked and the rail moved inwardly or outwardly as desired. The spring 213 also serves to give a yielding support to the rail so that it may give if the pressure against it becomes too great.

The sliced loaves are received upon a platform 215 (Fig. 2) and are carried away (as to a wrapping machine) by a conveyer comprising chains 216 bearing cross lugs 217. At one end these chains pass around sprockets 218 upon a shaft 219 connected by gears 220 with a shaft 221. The latter shaft bears a sprocket 222 around which passes the driving chain 96 previously referred to. The other end of the chains pass around sprockets 223 journaled in a frame 224. The pushers 217 are, therefore, driven in timed relation to the wrapping machine, and are controlled by the main clutch, in the same manner as the pushers 72. When they are stopped by the clutch the loaves being forwarded by them always stop in the same position, so that registration with the wrapping machine is assured.

The loaves are carried by the pushers 217 between side guides 225 (Figs. 2 and 4) secured to rods 226. Each rod is held adjustably in a bracket 227 by a set screw 228 so that the loaf may be properly centralized with respect to the infeed conveyer 229 of the bread wrapping machine. Since the loaf travels through the slicing machine with one edge always in contact with the relatively stationary side guide 190 it may need to be shifted transversely into the position desired for transfer to the wrapping machine. The guides 225 are, therefore, made flexible and are slotted at 230 to straddle rods 231 secured by set screws 232 to brackets 233. Short guides 234 are fixed on the ends of the rods and extend into abutting relation to the guides 201 as shown in Fig. 4. The slots 230 permit the guides 225 to shift according to the variation in length between the ends of rods 226 and 231 due to changes in the angular position of the guides.

In order to insure that the pushers 72 will not damage or tip over the sliced loaves as they move into angular position around the sprockets 67 the loaves are speeded up by a roll 235 fixed on shaft 219 and of somewhat larger pitch diameter than the sprockets 218. This roll has, therefore, a slightly higher surface speed than the pushers 217, which themselves move faster than the pushers 72, and serves to advance the loaves rapidly during the time when they are freeing themselves from the pushers 72. It is preferable to separate the side guides 234 slightly at their ends adjacent the roll so that the slices of bread will be relatively loose when the loaf is struck by the pushers 217. This action straightens up any irregularity in the position of the slices which may have been caused by the several cutting operations. As a further straightening device a plate 236 may be pivoted below the table at 237 and held normally in a position projecting through a slot 238 in the table. This plate is struck by the advancing loaf a light blow sufficient to push back any projecting slice without damage, the end guides being, as pointed out above, separated so that they do not bind the loaf at this instant.

The guides 173 and 190 are preferably provided with pads 240 (Fig. 19) adjacent the points where the loaf engages a cutter which is spaced the minimum amount from the guide. Referring to guide 190 in Fig. 3 it will be observed that the adjacent cutter 28 of the first gang is spaced four units from the guide. The adjacent cutter of the second gang is two units, the third three units, and the last one unit. With a spacing between the cutter and guide of two units or more no difficulty is experienced, but in the case of the cutter of the fourth gang the compression of the slice between the tapered cutting blade and the guide may become high enough so that rubbing away of part of the slice surface might occur if no correction were introduced. The pads 240 cause a slight shifting of the uncut portions of the loaf so that the edge of the cutter strikes it at a distance $x$ from the pad equal to the distance between the thicker portion of the cutter and the body of the guide. This action is clearly illustrated in Fig. 19. Preferably also one or both of the guides is tapered as in Fig. 22 to equalize the pressure on the upper and lower portions of the loaf when in contact with a cutter. Instead of making the pads 240 solid as shown in Fig. 19, they may be formed of one or more flat bow springs 241 (Fig. 19a) secured at one end to the guide 190 and passing through holes 242 in it. The spring form of guides has the advantage that it not only shifts the loaf towards the cutters at the point of engagement, but is variable in its effect to accommodate slight inequalities in loaves of the same run.

Since the cutting blades must revolve at a high speed and require an amount of power relatively high with respect to the several conveyers they are preferably driven from a separate source of power. For this purpose the several cutter spindles are interconnected with sprockets and chains indicated at 245 in Figs. 1 and 3, and the first spindle is coupled to the shaft of a motor 246 by a chain 247.

Crumb deflecting baffles 250 (Fig. 1) are preferably secured to the frame underneath the gangs of cutters, being slanted to direct the crumbs into removable trays 251. These trays are conveniently formed with beaded edges 252 which slide upon shelves 253 so that the trays may be removed by drawing them laterally of the machine. The tops of the baffles are spaced from the cutters and the ends of the frame are left open so that air may flow through the machine to cool the cutters. A considerable amount of heat is developed by the cutting operation which if not dissipated will cause the blades to buckle and their cutting edges to assume a sinuous form. The rotation of the blades is all in the same direction, as shown by the arrows in Fig. 1, and their frictional drag on the air creates a fan action causing a steady flow through the space above the baffles while the machine is in operation.

What is claimed is:

1. A bread slicing machine comprising a table, a plurality of gangs of rotating disk cutters extending upwardly through the table with the cutters of the several gangs staggered with respect to each other, an endless continuously moving conveyer above the table, spaced loaf pushers thereon, and loaf top holders associated with each pusher, the pushers and holders being each unitary and slotted to permit them to pass the several cutter gangs.

2. A bread slicing machine comprising a table, a plurality of gangs of rotating disk cutters extending upwardly through the table with the cutters of the several gangs staggered with respect to each other, an endless continuously moving conveyer above the table, spaced loaf pushers thereon, a loaf top holder associated with each pusher, and means for holding the holders positively at a predetermined spacing from the table during their travel.

3. A bread slicing machine comprising a table, a plurality of gangs of rotating disk cutters extending upwardly through the table with the cutters of the several gangs staggered with respect to each other, an endless continuously moving conveyer above the table, spaced loaf pushers thereon, a loaf top holder associated with each pusher, and means for guiding said holders so that they contact with the loaves only after the loaves have been partially severed by the first gang of cutters.

4. A bread slicing machine comprising a table, a plurality of gangs of rotating disk cutters extending upwardly through the table with the cutters of the several gangs staggered with respect to each other, an endless continuously moving conveyer above the table, spaced loaf pushers thereon, loaf top holders pivotally mounted relative to each pusher, the pushers and holders being slotted to permit them to pass the several cutter gangs, spring means tending to hold the holders out of contact with the loaves, a roll on each holder, and an adjustable rail against which the rolls run to hold the holders positively at a predetermined spacing from the table during their travel.

5. A bread slicing machine comprising a table, a plurality of gangs of rotating disk cutters extending upwardly through the table with the cutters of the several gangs staggered with respect to each other, an endless continuously moving conveyer passing around sprockets above the table and having loaf pushers thereon spaced apart a distance only slightly greater than the width of a loaf, a continuously moving longitudinal conveyer inclined upwardly relative to the first-named conveyer, pushers having forward loaf contacting surfaces and pivoted to the inclined conveyers, and means cooperating with said pushers to cause them to disengage a loaf with their loaf contacting surfaces moving parallel to the rear side of the loaf, the inclined conveyer operating to deliver loaves between the pushers of the first conveyer as said pushers are passing around one of the sprockets.

6. A bread slicing machine comprising a table, a plurality of gangs of rotating disk cutters extending upwardly through the table with the cutters of the several gangs staggered with respect to each other, an endless continuously moving conveyer passing around sprockets above the table and having spaced loaf pushers thereon, and a continuousy moving longitudinal conveyer having spaced pushers moving faster than the pushers of the first conveyer for delivering loaves between the pushers of the first conveyer as said pushers are passing around one of the sprockets.

7. A bread slicing machine comprising a table, a plurality of gangs of rotating disk cutters extending upwardly through the table with the cutters of the several gangs staggered with respect to each other, an endless continuously moving conveyer passing around sprockets above the table and having loaf pushers thereon spaced apart a distance only slightly greater than the width of a loaf, and a continuously moving longitudinal conveyer inclined upwardly relative to the first-named conveyer and having spaced pushers moving faster than the pushers of the first conveyer for delivering loaves between the pushers of the first conveyer as said pushers are passing around one of the sprockets.

8. A bread slicing machine comprising a slotted table, a plurality of gangs of rotating disk cutters extending upwardly through the table with the cutters of the several gangs staggered with respect to each other, means for conveying the loaves past the cutters, a side guide adjacent one end of the cutter gangs, and a second side guide interfitting with the slots in the table so that it can be located at varying distances away from the first side guide.

9. A bread slicing machine comprising a table, a plurality of gangs of rotating disk cutters extending upwardly through the table with the cutters of the several gangs staggered with respect to each other, an endless continuously moving conveyer above the table and having spaced loaf pushers thereon, a laterally moving conveyer beyond the feeding end of the first conveyer, a longitudinally moving conveyer having spaced pushers moving faster than the pushers of the first conveyer for receiving loaves from the lateral conveyer and delivering them between the pushers of the first conveyer, a stop plate for positioning loaves delivered by the lateral conveyer, and a spring pressed latch positioned beside the lateral conveyer to prevent rebound of the loaves after striking the stop plate.

10. A bread slicing machine comprising a table, a plurality of gangs of rotating disk cutters extending upwardly through the table with the cutters of the several gangs staggered with respect to each other, an endless continuously moving conveyer above the table and having spaced loaf pushers thereon, a laterally moving conveyer beyond the feeding end of the first conveyer, and a longitudinally moving conveyer having spaced pushers moving faster than the pushers of the first conveyer for receiving loaves from the lateral conveyer and delivering them between the pushers of the first conveyer.

11. A bread slicing machine comprising a table, a plurality of gangs of rotating disk cutters extending upwardly through the table with the cutters of the several gangs staggered with respect to each other, an endless continuously moving chain conveyer above the table and having spaced loaf pushers thereon, sprockets around which said conveyer passes, a laterally moving conveyer beyond the feeding end of the first conveyer and slanted away from the plane of the table, and a conveyer moving upwardly in a slanting direction at the end of the lateral conveyer and towards the first conveyer, the third-named conveyer having pushers movable at a surface speed greater than that of the first conveyer and moving out of contact with the loaves so as to deposit them successively on the table between the pushers of the main conveyer.

12. A bread slicing machine comprising a table, a plurality of gangs of rotating disk cutters extending upwardly through the table with the cutters of the several gangs staggered with respect to each other, an endless continuously moving chain conveyer passing around sprockets above the table and having spaced loaf pushers thereon, a table onto which the sliced loaves are delivered by said pushers, and an endless continuously moving conveyer having pushers thereon movable at a higher speed than the first-named pushers.

13. A bread slicing machine comprising a table, a plurality of gangs of rotating disk cutters extending upwardly through the table with the cutters of the several gangs staggered with respect to each other, an endless continuously moving chain conveyer passing around sprockets above the table and having spaced loaf pushers thereon, a table onto which the sliced loaves are delivered by said pushers, an endless continuously moving conveyer extending around sprockets below the second named table and having pushers thereon movable at a higher speed than the first-named pushers, and a roll rotatable with the sprockets for the second conveyer but of larger pitch diameter and extending into contact with the bottoms of the sliced loaves to give to the loaves a temporary increased speed to clear them from the first-named pushers.

14. A bread slicing machine comprising a plurality of cutters, means for advancing a loaf past the cutters, a table onto which the sliced loaf is deposited by said advancing means, end guides for the ends of the sliced loaf, said guides being spaced further apart where they receive the loaf than in their remaining portion, and a conveyer having pushers movable to strike the loaf a blow to push back any misaligned slices while the loaf is in the wide portion of the end guides, and then to move the loaf between the narrower portion of the end guides.

15. A bread slicing machine comprising a plurality of cutters, means for advancing a loaf past the cutters, a conveyer having spaced pushers to deliver the sliced loaf from the machine and means for moving the conveyer at a rate of speed sufficient to strike the loaf a blow to push into place any misaligned slices.

16. A bread slicing machine comprising a plurality of cutters, means for advancing a loaf past the cutters, a delivery table, a spring pressed plate projecting through the table, means for carrying the loaf over the delivery table and past said plate, and means for guiding the ends of the sliced loaf without substantial pressure at the time the loaf passes the plate.

17. A bread slicing machine comprising a plurality of cutters, means for advancing a loaf past the cutters, a delivery table, a conveyer having spaced pushers for carrying the sliced loaf along the table, and means for moving the sliced loaf temporarily ahead of the pushers so that said pushers will strike the rear of the loaf a sharp blow upon overtaking it and thereby reposition any misaligned slice.

18. A bread slicing machine comprising a plurality of cutters, means for advancing a loaf past the cutters, a delivery table, a conveyer having spaced pushers for carrying the sliced loaf along the table, means for moving the sliced loaf temporarily ahead of the pushers so that the pushers will strike the rear of the loaf a sharp blow upon overtaking it and thereby reposition any rearwardly projecting misaligned slice, and a yielding plate against which the sliced loaf is moved to reposition any forwardly projecting misaligned slice.

19. A bread slicing machine comprising a plurality of gangs of rotating disk cutters with the cutters of the several gangs staggered with respect to each other, a conveyer carrying loaves past the cutters, means for feeding loaves to said conveyer, a guideway into which loaves may be stacked and from which they are taken by said feeding means, and a clutch means responsive to the absence of a loaf at a predetermined point in the guideway for stopping the motion of the feeding means without interrupting the movement of said conveyer.

20. A bread slicing machine comprising a plurality of gangs of rotating tapering disk cutters spaced along the path of travel of the loaves, means for conveying the loaves past the gangs of cutters, and side guides for the loaves having one or more flat bow springs thereon located adjacent the entrance to one of the cutter gangs beyond the first to form a locally and laterally displaced portion of the guide deflecting the loaf ends laterally as the loaf enters the cutter gang.

EDMOND E. POULIN.